(12) United States Patent
Dubé

(10) Patent No.: US 9,078,412 B2
(45) Date of Patent: Jul. 14, 2015

(54) BEDDING SPREADER

(76) Inventor: Roger Dubé, St-Denis (CA)

( * ) Notice: Subject to any disclaimer, the term of this patent is extended or adjusted under 35 U.S.C. 154(b) by 573 days.

(21) Appl. No.: 13/407,809

(22) Filed: Feb. 29, 2012

(65) Prior Publication Data

US 2013/0186988 A1    Jul. 25, 2013

(51) Int. Cl.
*A01C 17/00* (2006.01)
*A01C 23/00* (2006.01)
*A01K 1/015* (2006.01)

(52) U.S. Cl.
CPC ............... *A01K 1/015* (2013.01); *A01C 17/003* (2013.01); *A01C 23/002* (2013.01); *A01C 23/003* (2013.01)

(58) Field of Classification Search
CPC ... A01C 17/003; A01C 23/002; A01C 23/003
USPC ......... 239/142, 172, 672, 681, 683, 687, 688, 239/689
See application file for complete search history.

(56) References Cited

U.S. PATENT DOCUMENTS

| | | | |
|---|---|---|---|
| 3,129,739 A | | 4/1964 | Wenger |
| 3,443,763 A | * | 5/1969 | Wolford .................. 239/666 |
| 3,915,392 A | | 10/1975 | Kugler |
| 3,980,236 A | * | 9/1976 | Richardson ............. 239/172 |
| 3,997,118 A | * | 12/1976 | Bedwell et al. .......... 239/651 |
| 4,448,361 A | | 5/1984 | Marcy |
| 4,779,810 A | | 10/1988 | Frey |
| 5,143,310 A | | 9/1992 | Neier |
| 5,215,266 A | | 6/1993 | Zimmerman |
| 5,215,500 A | | 6/1993 | Kirby |
| 5,277,372 A | | 1/1994 | Paul et al. |
| 5,361,711 A | * | 11/1994 | Beyerl ....................... 111/127 |
| 5,505,391 A | * | 4/1996 | Krueger et al. .......... 241/55 |
| 5,573,190 A | | 11/1996 | Goossen |
| 5,895,001 A | | 4/1999 | Kuelker et al. |
| 6,027,054 A | | 2/2000 | Kaye et al. |
| 6,572,039 B1 | | 6/2003 | Kruer et al. |
| 7,036,757 B2 | | 5/2006 | Kisenwether |
| 7,566,019 B1 | | 7/2009 | Dueck |
| 2002/0100825 A1 | | 8/2002 | Gregory |
| 2007/0290087 A1 | | 12/2007 | Weiss |
| 2008/0185464 A1 | | 8/2008 | Nitta |
| 2011/0192924 A1 | | 8/2011 | Kisenwether |
| 2011/0220748 A1 | * | 9/2011 | Bennett ..................... 241/30 |
| 2012/0074246 A1 | * | 3/2012 | Bilodeau .................. 239/689 |

FOREIGN PATENT DOCUMENTS

| | | |
|---|---|---|
| EP | 1245142 | 10/2002 |
| EP | 2374347 | 10/2011 |

(Continued)

*Primary Examiner* — Ryan Reis
(74) *Attorney, Agent, or Firm* — Norton Rose Fulbright Canada LLP; Alexandre Daoust

(57) ABSTRACT

The bedding spreader has an impeller rotatable inside a housing, the impeller having a plurality of vanes rotatable around a horizontal axis, in a vertical impeller plane; the housing having an inlet opening on one side of the impeller plane and being aligned with the impeller for the impeller to receive bedding through the inlet opening during use, and an outlet opening on the other side of the impeller plane, the outlet opening being spaced from the impeller, the housing forming a bedding path in which the bedding is thrusted tangentially by the impeller against a deflector arrangement made integral to the housing, the deflector arrangement then redirecting the tangential movement of the bedding imparted by the impeller to a movement more parallel to the axis, through the outlet opening.

23 Claims, 4 Drawing Sheets

(56) References Cited

FOREIGN PATENT DOCUMENTS

| | | |
|---|---|---|
| FR | 2741507 | 5/1997 |
| GB | 2135177 | 8/1984 |
| WO | 9510176 | 4/1995 |

* cited by examiner

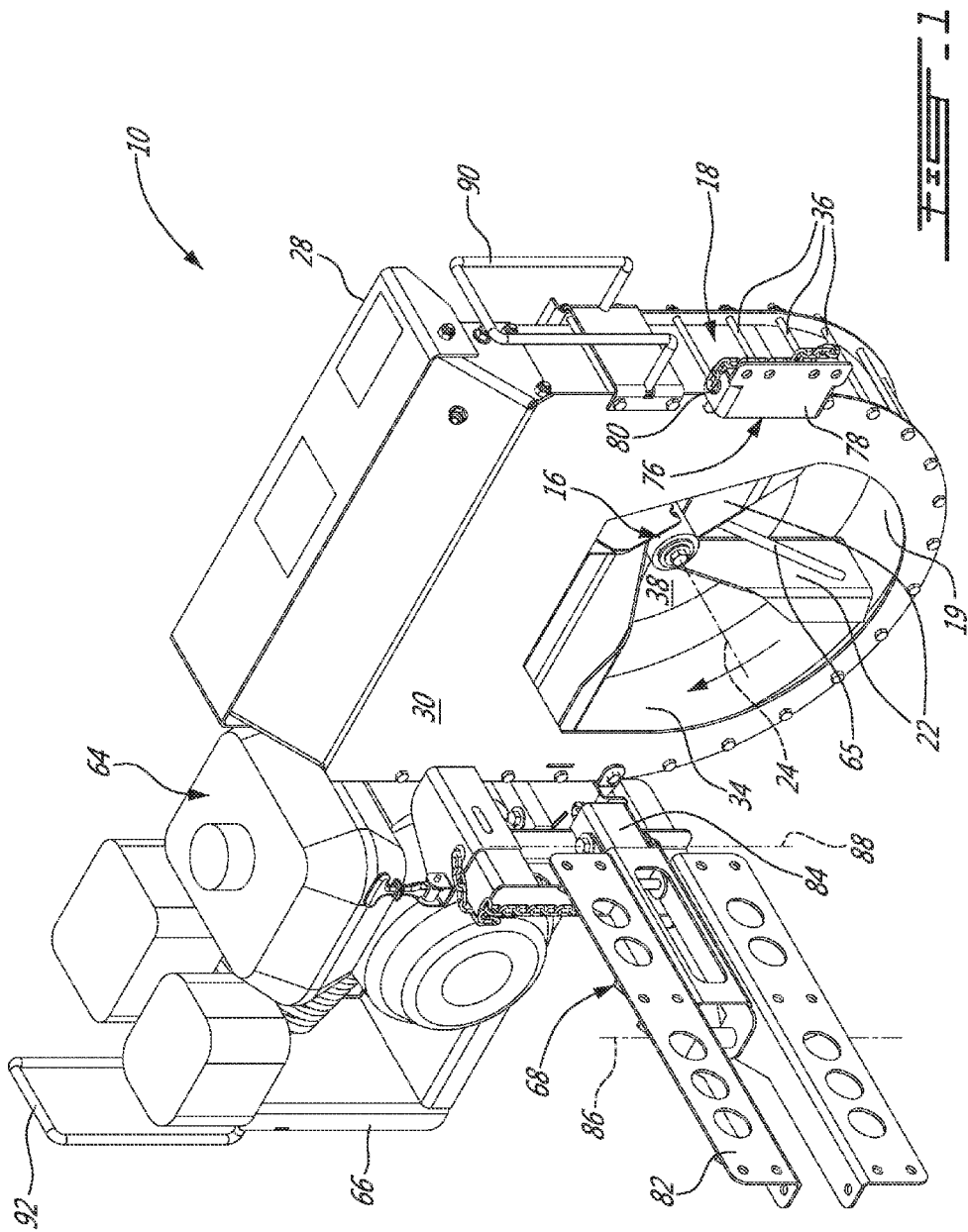

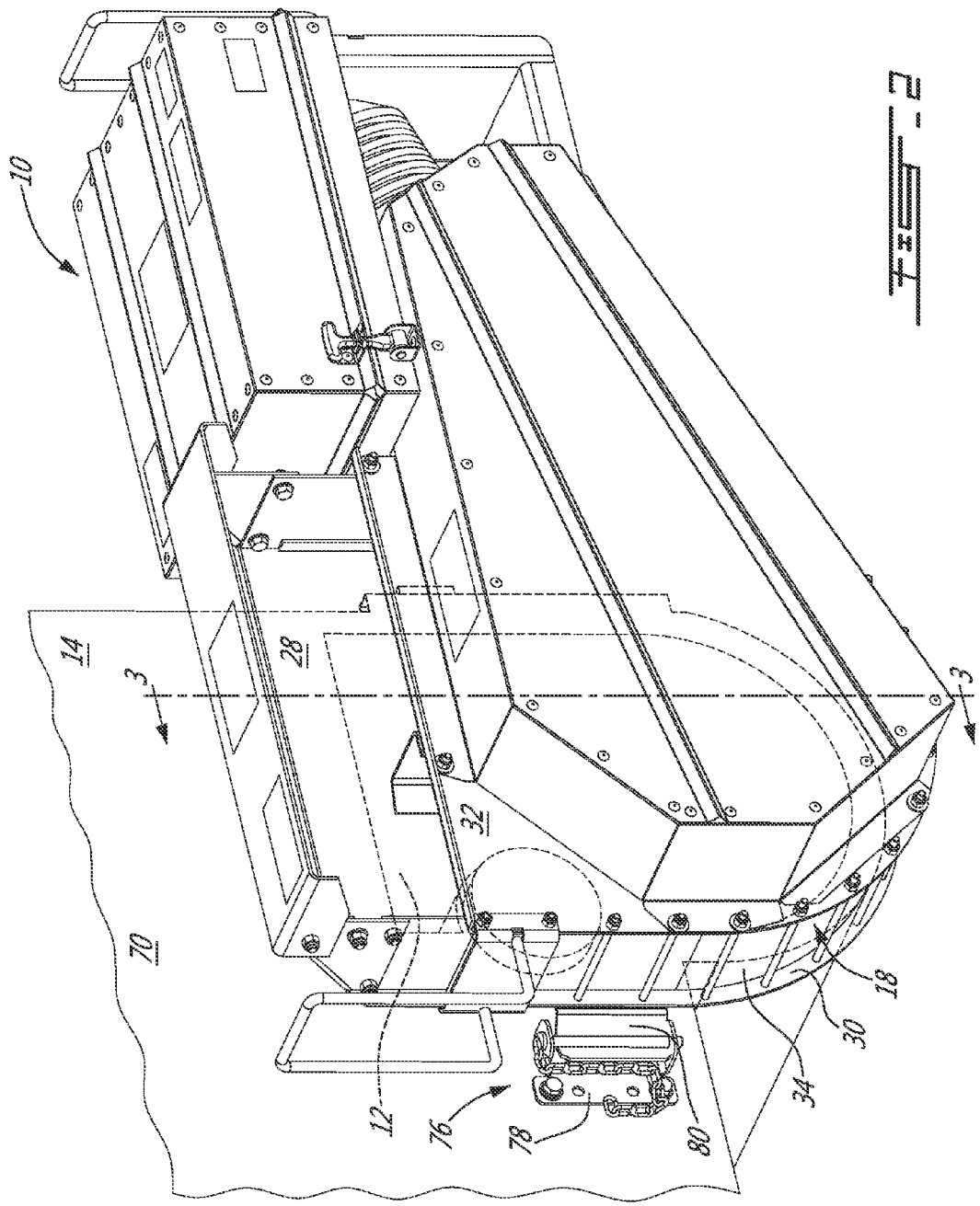

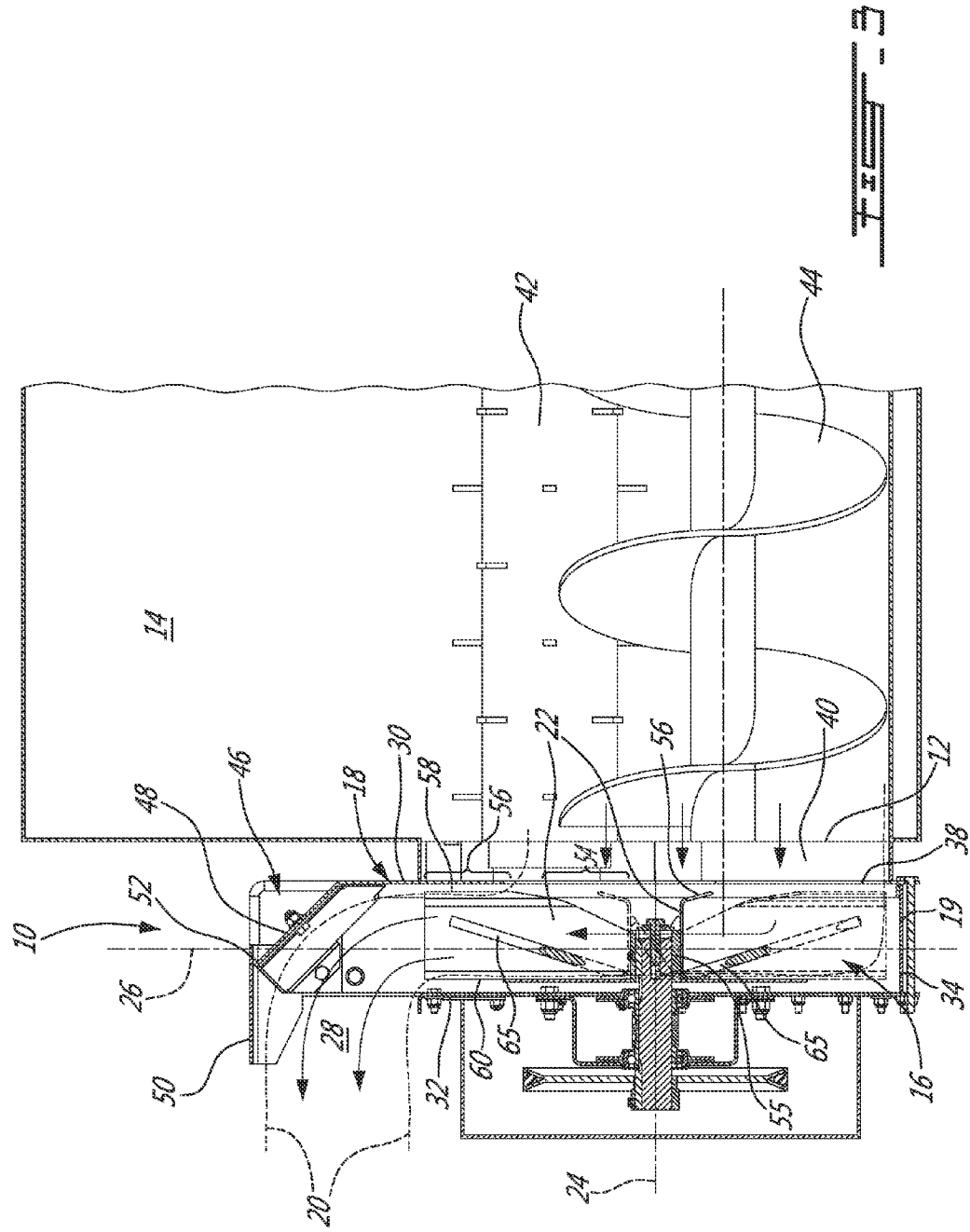

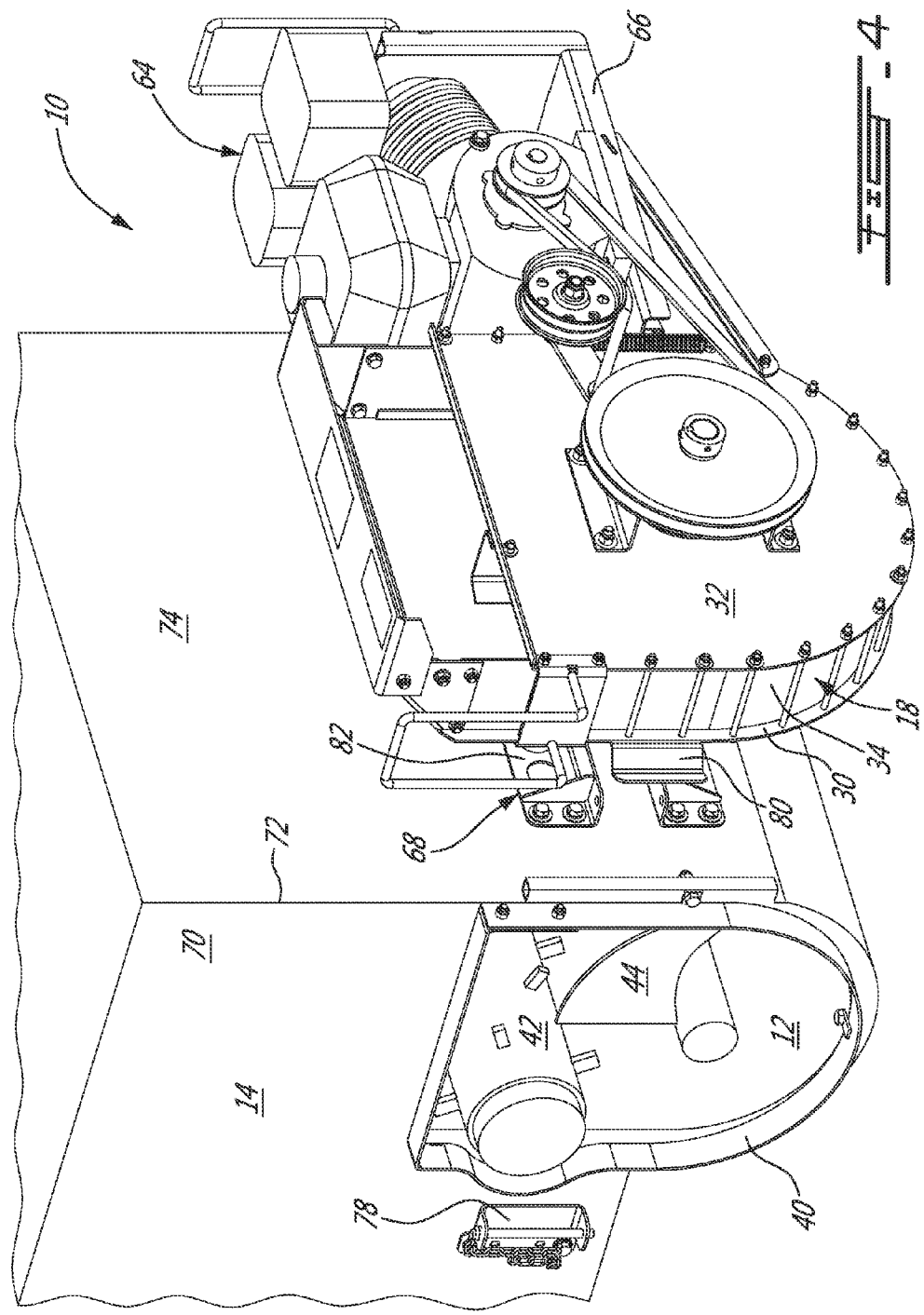

BEDDING SPREADER

CROSS-REFERENCE TO RELATED APPLICATIONS

This application claims priority of Canadian application no. 2 765 311, filed Jan. 25, 2012 by applicant, the contents of which are hereby incorporated by reference.

BACKGROUND

Many types of livestock require bedding in their pens. Cows for instance spend a lot of time in their respective stalls where a good layer of bedding helps keep them clean and comfortable, rather than standing directly on a concrete floor for instance. The bedding can consist of different types of particulate materials, shredded straw, wood shavings, peat moss and sand being common choices.

The handling of bedding material is time and resource consuming, and there remained room for improvement.

SUMMARY

In accordance with one aspect, there is provided a bedding spreader mountable to a feeder outlet of a feeder machine, the bedding spreader comprising an impeller rotatable inside a housing, the impeller having a plurality of vanes rotatable around a horizontal axis, in a vertical impeller plane; the housing having a curved wall snugly surrounding a lower portion of the impeller, an inlet wall on one side of the impeller plane and mountable against the feeder machine, and an outlet wall on the other side of the impeller plane, the inlet wall having an inlet opening exposing the impeller to receive bedding from the feeder outlet during use, the housing forming a bedding path in which the bedding is thrusted upwardly by rotation of the impeller, against a deflector arrangement made integral to the housing, the deflector arrangement thence redirecting the upward movement of the bedding imparted by the impeller to a more horizontal movement through an outlet opening provided in the outlet wall.

In accordance with another aspect, there is provided a kit mountable to a feeder outlet of a feeder machine, the kit comprising at least one bracket fixable to the feeder machine; and a bedding spreader comprising an impeller having a plurality of vanes rotatable around a horizontal axis, in a vertical impeller plane, the impeller being housed inside a housing having an inlet wall on one side of the impeller plane and having an inlet opening exposing the impeller, and an outlet wall on the other side of the impeller plane, and at least one attachment securable to the at least one bracket for mounting the bedding spreader to the feeder machine with the inlet opening communicating with the feeder outlet; the housing forming a bedding path in which the bedding is thrusted upwardly by the impeller against a deflector arrangement made integral to the housing, the deflector arrangement thence redirecting the upward movement of the bedding imparted by the impeller to a more horizontal movement through an outlet opening provided in the outlet wall.

In accordance with another aspect, there is provided a bedding spreader, the bedding spreader comprising an impeller rotatable inside a housing, the impeller having a plurality of vanes rotatable around a horizontal axis, in a vertical impeller plane; the housing having an inlet opening on one side of the impeller plane and being aligned with the impeller for the impeller to receive bedding through the inlet opening during use, and an outlet opening on the other side of the impeller plane, the outlet opening being spaced from the impeller, the housing forming a bedding path in which the bedding is thrusted tangentially by the impeller against a deflector arrangement made integral to the housing, the deflector arrangement thence redirecting the tangential movement of the bedding imparted by the impeller to a movement more parallel to the axis, through the outlet opening.

Many further features and combinations thereof concerning the present improvements will appear to those skilled in the art following a reading of the instant disclosure.

DESCRIPTION OF THE FIGURES

In the figures,

FIG. 1 is an oblique view from an inlet side of an example of a bedding spreader;

FIG. 2 is an oblique view from an outlet side of the bedding spreader, shown mounted to a feeder machine;

FIG. 3 is a cross-sectional view taken along lines 3-3 of FIG. 2; and FIG. 4 is another oblique view of the bedding spreader mounted to a feeder machine, shown in a stowed position.

DETAILED DESCRIPTION

FIG. 1 shows an example of a bedding spreader 10. In this example, the bedding spreader 10 is particularly well adapted for spreading a bedding material consisting of particulate material having a given minimal size and low weight, such as shredded straw, wood shavings and peat moss, for instance, and can also be used for or adapted to other bedding material types. The bedding spreader 10 can be adapted to be mounted to a feeder outlet 12 of a bedding feeder machine 14 as will be later discussed in relation to FIGS. 2 to 4.

The bedding spreader 10 can be seen to have an impeller 16 which is rotatably mounted in a manner to be rotatable inside a housing 18 which forms a bedding path 20 along which the bedding from the feeder outlet 12 is thrusted by the impeller 16. More particularly, the impeller 16 has a plurality of vanes 22 which rotate around a horizontal axis 24. The vanes 22 can be said to be aligned in a vertical plane which will be referred to herein as the impeller plane 26.

In this example, to adapt to the particular height of the stalls and of the feeder outlet 12 of the bedding feeder machine 14, the outlet opening 28 of the bedding spreader 10 is positioned above the impeller 16. The housing 18 thus includes a semi-circular curved wall 19 which snugly surrounds a lower portion of the impeller 16 and which prevents the bedding from escaping to the sides or to the bottom. The clearance between the vanes 22 and the curved wall 19 should be minimized while allowing a safety margin to account for normal vibration effects and the like, in order to maintain a satisfactory efficiency of the impeller 16.

The housing 18 has an inlet wall 30 forming an inlet face on one side of the impeller plane 26 and mountable against the feeder machine 14, and an outlet wall 32 forming an outlet face on the other side of the impeller plane 26. In this example, the inlet wall 30 is formed of a first metal sheet plate, the outlet wall 32 is formed of a second metal sheet plate, and a U-shaped plate 34 is sandwiched between the first and second metal sheet plates. The U-shaped plate 34 extends transversally between the first and second metal plates, forms the curved wall 19 extending partially around the impeller 16 and is open above the impeller 16. In this example, the first and second metal sheet plates are held to one another with bolts 36 squeezing the inlet wall 30 toward the outlet wall 32 with the U-shaped plate 34 trapped therebetween and maintaining its shape. During use, the U-shaped plate 34 is subjected to a significant amount of stress and friction and has a limited lifespan. The bolts 36 can be unfastened to access and replace the U-shaped plate 34.

The inlet wall 30 is apertured by an inlet opening 38. The inlet opening 38 exposes the impeller 16 to receive bedding from the feeder outlet 12 during use. With an upper outlet 28 such as in the example described herein, upward vertical thrust is work which is required from the impeller 16 for thrusting the bedding through the outlet opening 28. This work is effected by the vanes 22 which pass in the lower portion of the housing 18 as they rotate, and more specifically on a specific side (i.e. in a given quadrant) depending on the rotation direction. If the rotation is clockwise, as shown in FIG. 1, desired work from the impeller 16 is particularly effected as the vanes 22 travel along the lower, left-side quadrant. The inlet opening 38 can be designed, and the relative position of the bedding spreader 10 and the feeder outlet 12 selected to direct the bedding material in a narrowed down region of the impeller 16. In the illustrated embodiment, the inlet opening 38 spans over the center region of the impeller 16 where the vanes 22 are narrower and most of the lower quadrants, especially the left-side quadrant since the rotation is designed to be clockwise in this particular example.

Turning now to FIGS. 2 and 3, the bedding spreader 10 is shown mounted to a feeder machine 14, ready for use. The bedding spreader 10 is positioned for the feeder outlet 12 to be aligned with the inlet opening 38, and more particularly centered toward the lower quadrants of the impeller 16. The feeder machine 14 can be any suitable feeder, such as, for instance, a feed cart which is fitted with mechanical components required to break down large square bales and convey the broken portions of the bale through the feeder outlet 12, into contact with the impeller vanes 22. Different sizes and types of feed carts can be accommodated with a single size bedding spreader 10 by using a specific adapter 40 for the feed cart, as will be detailed below. In FIG. 3, a WIC™ feed cart is schematized with a bale-breaking cylinder 42 and an endless screw conveyor 44 which pushes the broken pieces of the bale into the impeller 16.

During use, the bale can be pushed against the bale-breaking cylinder 42 by a belt or chain conveyor in a continuous manner, and the endless screw conveyor 44, the bale breaking cylinder 42, and the impeller 16 can rotate in a continuous manner. For a WIC™ 52 feed cart having an feeder outlet 12 with a ~10-14 inch diameter aligned with a lower region of an impeller 16 having 17-18 inches in diameter and rotating at roughly 1000 RPM provided good results. It is likely that WIC™ model no. 42 or 70 feed carts can be accommodated with the same bedding spreader 10 with little or no adaptation apart from providing a kit including a different adapter 40 to bridge the area between the feed cart outlet 12 and the bedding spreader inlet opening 38. Other sizes, brand names, and models of feed carts can be accommodated as well, such as those manufactured by AgriVal, Val metal, Rovibec, etc. Other types of feeders or feeder machines can likely be accommodated as well, such as feeders which can feed other types of bedding materials for instance.

In the case of a feed cart for straw bales, as the broken bale portions are conveyed to the impeller 16, the impeller 16 can further break down the bale if required, shredding it into sizes appropriate for use as bedding. The shreds are thrusted upwardly by rotation of the impeller 16, against a deflector arrangement 46 which can be made integral to the housing 18. The deflector arrangement 46 then redirects the upward movement of the shreds which was imparted by the impeller 16 to an orientation closer to the horizontal, in a direction extending through the outlet opening 28 provided in the outlet wall 32, away from the feeder machine 14, and to the area where the shreds are to be spreaded.

In this particular embodiment, the deflector arrangement 46 includes a sloping deflector member 48 which can be a flat plate extending horizontally above the impeller 16 in the transversal direction (along a transversal horizontal axis), but which is inclined along the horizontal axis at an intermediary angle, such as 45° for instance. The deflector arrangement 46 further includes an output deflector member 50 which can be a flat plate oriented along a horizontal plane and extending away from an upper edge 52 of the sloping deflector member, away from the impeller plane 26. Tests were done using a curved surface rather than a flat sloping deflector member 48, but better results were achieved using a flat plate with straw, curved surfaces tending to be prone to straw accumulations. Nonetheless, curved surfaces can be preferred in alternate embodiments, such as with an other bedding material for instance.

Still referring to FIG. 3, the details of the specific type of vanes 22 which was found satisfactory in this specific application are provided. In the radial orientation, each one of the vanes can be said to have both a radially-inner end 54 which is secured to an axial shaft 55 of the impeller 16 and an opposite radially-outer end 56 which is free. In the axial orientation, each one of the vanes 22 can be said to have an inlet-facing edge 58 and an outlet-facing edge 60. In this specific example, the inlet-facing edge 58 of the radially-inner end 54 slopes axially-inward toward the shaft 55, forming a free area 62 out of interference from the vanes as the vanes rotate. Because of the sloping angle of the inlet-facing edge 58, this free area 62 is roughly conical in shape and is centered on the axis 24. This free area was found favourable to the functioning of the bedding spreader 10. Further, it will be noted that the inlet-facing edge 58 of the radially-outer end 56 of the vanes 22 are bent tangentially. This tangential bend, when oriented a direction of rotation of the vanes, was also found favourable to the functioning of the bedding spreader 10, especially in assisting the further shredding of straw bedding material where required, and assisting in directing the straw trapped thereagainst into the upward thrust movement referred to above. In this example, struts are used to increase the resistance of the vanes 22.

In FIG. 4, some components of the bedding spreader 10 are removed, showing an example of means for driving the rotation of the vanes. In this example, a combustion engine is used as a motor 64 to drive the impeller 16. The combustion engine is supported on a frame structure 66 extending laterally from and made integral to the housing 18. Reduction gearing can be used to achieve the desired amount of RPM at the impeller 16 if desired. For instance, in the example described above, a Honda™ model GX 200 6.5 HP engine is used. Since this engine is designed for peak performance around 3600 RPM, a gear ratio of about 0.3 can be used to connect it to the impeller shaft. The gearing is achieved with a relatively simple belt and pulley arrangement in this particular embodiment. In alternate embodiments, the means for driving the rotation of the vanes can include an electric motor, a hydraulic motor, or a pneumatic motor for instance, with means to connect it to an associated power source which can be on the feeder machine 14 or elsewhere, for instance.

Also shown in FIG. 4 is an optional pivot arm mount 68 which allows to easily move the bedding spreader 10 between an operational position for use, such as shown in FIGS. 2 and 3, and a stowed position such as shown in FIG. 4. When using a feed cart as the feeder machine 14, for instance, such an optional pivot arm mount 68 can allow leaving the bedding spreader 10 permanently attached to the feed cart while allowing one to easily switch between its usual feed cart function and its new bedding spreader 10 function simply by changing the position of the bedding spreader 10 using the optional pivot arm mount 68. The details of the illustrated example pivot arm mount 68 are provided below.

As shown in FIG. 4, for a typical feed cart, the feeder outlet 12 can be provided in a parallel wall 70 and is adjacent a corner 72 between the parallel wall 70 and a normal wall 74 of the feeder machine 14 (typically a rear wall—the location of the feeder outlet 12 can vary depending on the particulars of the feeder machine 14). As shown in FIG. 1, the bedding spreader 10 can have a detachable mount 76 positioned adjacent the impeller 16, away from the corner. The detachable mount 76 can include a bracket 78 to be mounted on the parallel wall of the feeder machine 14 and a corresponding attachment 80 provided integral to the housing 18 for connection with the bracket 78. If the optional pivot arm mount 68 is used, the pivot arm mount 68 can include a base 82 in the form of a large bracket which is securable to the normal wall 74 of the feeder, and a pivot arm 84 having a first end pivotally mounted to the base 82 along a first vertical axis 86 offset from the corner 72, and a second end pivotally mounted to the housing 18 along a second vertical axis 88 positioned on a side of the impeller 16 adjacent the corner 72, opposite the detachable mount 76.

Henceforth, when the detachable mount 76 is detached, the impeller 16 can be removed from the feeder outlet 12 and both the bedding spreader 10 and the pivot arm 84 can be pivoted around the respective ones of the first and second vertical axes 86, 88 in order to both pivot and translate the bedding spreader 10 into the stowed position shown in FIG. 4. Preferably, the distance between the second vertical axis 88 and the first mount 76 is less than twice the distance between the first vertical axis 86 and the second vertical axis 88, in order for the bedding spreader 10 not to exceed laterally from the corner when it is in the stowed position of FIG. 4. If a frame structure 66 is used to support a motor 64, such as shown, the second vertical axis 88 can be positioned laterally between the frame structure 66 or motor 64 and the impeller 16.

Alternately, the bedding spreader 10 can be manufactured without the optional pivot arm mount 68, and be simply provided with one or more detachable mounts allowing to manually detach and remove the bedding spreader 10 from its position against the feeder outlet 12. To this end, handles 90, 92 connected to the housing 18 and/or framework of the bedding spreader 10 can be very handy to allow handling the bedding spreader 10 manually by an operator.

The bedding spreader 10 can be provided to consumers as part of a kit to convert a feeder machine 14 (such as a feed cart) already owned by the consumer to spread bedding. The kit can include one or more brackets (or base) fixable to the feeder machine 14, the bedding spreader 10 including attachments associated with the bracket(s), and can typically also include an adapter associated to the farmer's particular feeder machine 14, which is fixable to the feeder machine 14 around the feeder outlet 12 in a manner that it extends away therefrom to bridge a gap between the spreader and the feeder machine 14 when the spreader is mounted thereon.

Many variants and adaptations are possible, and the examples described above and illustrated are intended to be exemplary only. The scope is indicated by the appended claims.

What is claimed is:

1. A bedding spreader mountable to a feeder outlet of a feeder machine, the bedding spreader comprising an impeller rotatable inside a housing, the impeller having a plurality of vanes rotatable around a horizontal axis, in a vertical impeller plane; the housing having a curved wall snugly surrounding a lower portion of the impeller which prevents bedding from escaping to the sides or to the bottom of the housing, an inlet wall on one side of the impeller plane and mountable against the feeder machine, and an outlet wall on the other side of the impeller plane, the inlet wall having an inlet opening exposing the impeller to receive bedding from the feeder outlet during use, the housing forming a bedding path in which the bedding is thrusted upwardly by rotation of the impeller, against a deflector arrangement made integral to the housing, the deflector arrangement thence redirecting the upward movement of the bedding imparted by the impeller to a more horizontal movement through an outlet opening provided in the outlet wall.

2. The bedding spreader of claim 1 wherein the housing includes a first metal sheet plate forming the inlet wall, a second metal sheet plate forming the outlet wall, and a U-shaped plate sandwiched between the first and second metal sheet plates, extending partially around the impeller and open above the impeller, the U-shaped plate forming the curved wall, cooperating with the impeller, and forming a portion of the bedding path.

3. The bedding spreader of claim 2 wherein the first and second metal sheet plates are removably fastened to each other with the U-shape plate therebetween to allow disassembly thereof to replace the U-shaped plate once a predetermined level of wear of the U-shaped plate has been reached.

4. The bedding spreader of claim 1 wherein the deflector arrangement includes an output deflector member extending away from the impeller plane.

5. The bedding spreader of claim 4 wherein the output deflector member is flat and normal to the impeller plane.

6. The bedding spreader of claim 1 wherein each one of the vanes has a radially-inner end secured to an axial shaft and an opposite and free radially-outer end, an inlet-facing edge and an outlet-facing edge, wherein the inlet-facing edge of the radially-inner end slopes axially-inward toward the shaft forming an axial conical-shaped free area when the vanes are rotated.

7. The bedding spreader of claim 6 wherein the inlet opening spans across the lower portion of the impeller and across the conical-shaped free area.

8. The bedding spreader of claim 1 wherein the feeder outlet is provided in a parallel wall, and is adjacent a corner between the parallel wall and a normal wall of the feeder machine; wherein the bedding spreader has a detachable mount positioned adjacent the impeller, away from the corner, and a pivot arm mount comprising a base securable to the normal wall of the feeder, and a pivot arm having a first end pivotally mounted to the base along a first vertical axis offset from the corner, and a second end pivotally mounted to the housing along a second vertical axis positioned on a side of the impeller adjacent the corner, opposite the detachable mount.

9. The bedding spreader of claim 8 wherein the distance between the second vertical axis and the first mount is less than twice the distance between the first vertical axis and the second vertical axis.

10. The bedding spreader of claim 8 wherein a frame structure extends laterally from the housing, further comprising a motor received on the frame structure and operatively connected to drive the impeller, the second vertical axis being positioned laterally between the motor and the impeller.

11. A kit removably mountable to a feeder outlet of a feeder machine, the kit comprising:

at least one bracket fixable to the feeder machine; and a bedding spreader comprising an impeller having a plurality of vanes rotatable around a horizontal axis, in a vertical impeller plane, the impeller being housed inside a housing having a curved wall snugly surrounding a lower portion of the impeller which prevents bedding from escaping to the sides or to the bottom of the housing, the impeller being spaced from the curved wall by a clearance, the clearance being minimized to account or normal vibration effects, the housing having an inlet wall on one side of the impeller plane and having an inlet opening exposing the impeller, and an outlet wall on the other side of the impeller plane, and at least one attachment securable to the at least one bracket for mounting the bedding spreader to the feeder machine with the inlet opening communicating with the feeder outlet; the housing forming a bedding path in which the bedding is thrusted upwardly by the impeller against a deflector arrangement made integral to the housing, the deflector arrangement thence redirecting the upward movement of the bedding imparted by the impeller to a more horizontal movement through an outlet opening provided in the outlet wall.

12. The kit of claim 11 further comprising an adapter fixable to the feeder machine, surrounding the feeder outlet and extending away therefrom to bridge a gap between the spreader and feeder machine when the spreader is mounted thereon.

13. The kit of claim 11 wherein the housing includes a first metal sheet plate forming the inlet wall, a second metal sheet plate forming the outlet wall, and a U-shaped plate sandwiched between the first and second metal sheet plates, extending partially around the impeller and open above the impeller, the U-shaped plate forming the curved wall, cooperating with the impeller, and forming a portion of the bedding path.

14. The kit of claim 11 wherein the deflector arrangement includes an output deflector member extending away from the impeller plane.

15. The kit of claim 11 wherein each one of the vanes has a radially-inner end secured to an axial shaft and an opposite and free radially-outer end, an inlet-facing edge and an outlet-facing edge, wherein the inlet-facing edge of the radially-inner end slopes axially-inward toward the shaft forming an axial conical-shaped free area when the vanes are rotated.

16. The kit of claim 11 wherein the feeder outlet is provided in a parallel wall, and is adjacent a corner between the parallel wall and a normal wall of the feeder machine; wherein the bedding spreader has a detachable mount positioned adjacent the impeller, away from the corner, and a pivot arm mount comprising a base securable to the normal wall of the feeder, and a pivot arm having a first end pivotally mounted to the base along a first vertical axis offset from the corner, and a second end pivotally mounted to the housing along a second vertical axis positioned on a side of the impeller adjacent the corner, opposite the detachable mount.

17. The kit of claim 16 wherein the distance between the second vertical axis and the first mount is less than twice the distance between the first vertical axis and the second vertical axis.

18. A bedding spreader mountable to a feeder outlet of a feeder machine, the bedding spreader comprising an impeller rotatable inside a housing, the impeller having a plurality of vanes rotatable around a horizontal axis, in a vertical impeller plane; the housing having a curved wall snugly surrounding a lower portion of the impeller, an inlet wall on one side of the impeller plane and mountable against the feeder machine, and an outlet wall on the other side of the impeller plane, the inlet wall having an inlet opening exposing the impeller to receive bedding from the feeder outlet during use, the housing forming a bedding path in which the bedding is thrusted upwardly by rotation of the impeller, against a deflector arrangement made integral to the housing, the deflector arrangement thence redirecting the upward movement of the bedding imparted by the impeller to a more horizontal movement through an outlet opening provided in the outlet wall; wherein the feeder outlet is provided in a parallel wall, and is adjacent a corner between the parallel wall and a normal wall of the feeder machine; wherein the bedding spreader has a detachable mount positioned adjacent the impeller, away from the corner, and a pivot arm mount comprising a base securable to the normal wall of the feeder, and a pivot arm having a first end pivotally mounted to the base along a first vertical axis offset from the corner, and a second end pivotally mounted to the housing along a second vertical axis positioned on a side of the impeller adjacent the corner, opposite the detachable mount.

19. The bedding spreader of claim 18 wherein the distance between the second vertical axis and the first mount is less than twice the distance between the first vertical axis and the second vertical axis.

20. The bedding spreader of claim 18 wherein a frame structure extends laterally from the housing, further comprising a motor received on the frame structure and operatively connected to drive the impeller, the second vertical axis being positioned laterally between the motor and the impeller.

21. The bedding spreader of claim 1 wherein the vanes have a planar main portion each coinciding with a vane plane being parallel to the horizontal axis, the vanes being mounted tangentially to the axial shaft and being spaced from the horizontal axis by a radius of the axial shaft.

22. The bedding spreader of claim 6 wherein the vanes have a planar main portion each coinciding with a vane plane being parallel to the horizontal axis, the radially-inner ends of the vanes being mounted tangentially to the axial shaft and being spaced from the horizontal axis by a radius of the axial shaft.

23. The bedding spreader of claim 11 wherein the vanes have a planar main portion each coinciding with a vane plane being parallel to the horizontal axis, the vanes being mounted tangentially to the axial shaft and being spaced from the horizontal axis by a radius of the axial shaft.

* * * * *